United States Patent [19]

Ritter

[11] Patent Number: 5,062,372
[45] Date of Patent: Nov. 5, 1991

[54] LINED HAZARDOUS WASTE INCINERATOR

[76] Inventor: Robert A. Ritter, 5108 Varscliff Road, NW., Calgary, Alberta, Canada, T3A 0G3

[21] Appl. No.: 603,536

[22] Filed: Oct. 24, 1990

[30] Foreign Application Priority Data

Dec. 20, 1989 [CA] Canada ................ 2006139

[51] Int. Cl.⁵ ............ F23G 5/00; F23G 7/00
[52] U.S. Cl. .................. 110/242; 110/235; 110/237; 110/250; 110/346; 432/241
[58] Field of Search ........... 110/237, 235, 242, 346, 110/250; 432/241

[56] References Cited

U.S. PATENT DOCUMENTS

| | | | |
|---|---|---|---|
| 682,313 | 9/1901 | Zwillinger . | |
| 1,747,816 | 2/1930 | Carrington . | |
| 1,906,023 | 4/1933 | Tobin . | |
| 2,196,343 | 4/1940 | Saltsman | 202/163 |
| 2,812,291 | 11/1957 | Hughes | 202/101 |
| 2,959,140 | 11/1960 | Friedberg | 110/18 |
| 3,098,458 | 7/1963 | Lantz, Jr. | 110/242 |
| 3,621,798 | 11/1971 | Pederson | 110/8 R |
| 4,084,521 | 4/1978 | Herbold et al. | 110/242 |
| 4,140,066 | 2/1979 | Rathjen et al. | 110/235 |
| 4,230,451 | 10/1980 | Chambe | 432/72 |
| 4,289,079 | 9/1981 | Swistun | 110/255 |
| 4,479,443 | 10/1984 | Faldt et al. | 110/346 |
| 4,495,873 | 1/1985 | Blankenship | 110/250 |
| 4,688,495 | 8/1987 | Galloway | 110/250 |
| 4,934,283 | 6/1990 | Kydd | 110/237 X |

FOREIGN PATENT DOCUMENTS

| | | | |
|---|---|---|---|
| 688561 | 6/1964 | Canada | 23/277 |
| 805446 | 2/1969 | Canada | 110/18 |
| 879446 | 8/1971 | Canada | 110/2 |
| 1164631 | 4/1984 | Canada | 23/375 |
| 1166654 | 5/1984 | Canada | 260/653.6 |
| 1169883 | 6/1984 | Canada | 260/653.2 |
| 1205683 | 6/1986 | Canada | 110/2 |
| 1230616 | 12/1987 | Canada | 260/653.2 |
| 0203683 | 11/1984 | Japan | 110/242 |

*Primary Examiner*—Edward G. Favors
*Attorney, Agent, or Firm*—Eckert Seamans Cherin & Mellott

[57] ABSTRACT

A hazardous waste incinerator is provided herein. The incinerator includes a sealed, inner incineration chamber which is either made from, or which is lined with a non-porous, impervious corrosion-resistant lining, the inner incineration chamber including a means for supporting hazardous waste to be incinerated, and a recirculating blower. An insulated outer combustion chamber is provided in sealed, spaced-apart relationship to the inner incineration chamber. The heat produced in the outer combustion chamber induces incineration of hazardous waste in the incinerator chamber, the products of incineration of the hazardous waste being separate and distinct from the products of combustion in the combustion chamber.

22 Claims, 7 Drawing Sheets

LINED HAZARDOUS WASTE INCINERATOR

BACKGROUND OF THE INVENTION (i) Field of the Invention

This invention relates to a hazardous waste incinerator and a novel method of incinerating hazardous waste.

(ii) Description of the Prior Art

Many patents are directed to waste incinerators and the following brief summary describes a representative number of such prior patents.

U.S. Pat. No. 682,313 patented Sept. 10, 1901 by B. Zwillinger, provided an apparatus for carbonizing material. The apparatus included hollow internal walls, a chimney leading from one end of the flue, and a superheating-furnace discharging its waste gases into the opposite end of the flue, and means for passing gas through such superheating-furnace and into the carbonizing-chamber.

U.S. Pat. No. 1,747,816 patented Feb. 18, 1930 by W. H. Carrington, provided a garbage furnace comprising a fuel chamber and a combustion chamber for the garbage separated by a partition wall, a fuel grate in the fuel chamber, and a garbage grate at a higher level in the combustion chamber. The partition wall was provided with a port above the grates. A secondary grate was provided in such combustion chamber for guarding such port against obstruction.

U.S. Pat. No. 1,906,023 patented Apr. 25, 1933 by K. J. Tobin provided an incinerator appliance including a combustion chamber provided with a heat emitting source. A substantially-closed receptacle was mounted in the chamber above such heat source. The receptacle and the heat emitting source constituted the incinerator.

U.S. Pat. No. 2,196,343 patented Apr. 9, 1940 by D. J. Saltsman, provided an apparatus for distilling wood including a base, and a plurality of heating passageways therein. A fire chamber communicated with the heating passageways, so that heat could circulate therethrough. The apparatus included an outer insulated wall section, and an inner casing mounted on the base adjacent to the inner edge of the annular passageway and in spaced relation with the outer wall section. A retort was disposed within the inner casing and was spaced from the inner surface thereof. A pipe carried off liquid from the retort. Means were provided for condensing vapours rising from the retort.

U.S. Pat. No. 2,812,291 patented Nov. 5, 1957 by C. H. Hughes, provided a broad oven including an elongated rectangular coking oven having a flat floor and capable of being sealed against air, and a heating flue system associated with such oven to supply heat. The heating system included a plurality of heating flues located directly under the floor of the oven, and side heating flues located in each side wall of the oven. A heat exchanger unit was associated with such heating flues to transfer heat from outgoing hot burnt products of combustion to incoming air. A vaulted arch was disposed over the entire upper part of the oven, and a vaulted roof was located directly over such arch and spaced therefrom to provide a fume chamber. A plurality of ports was provided in such arch directly to connect the oven to the fume chamber. At least one burner and associated air port communicated with the fume chamber to produce burnt products of combustion. An outlet port was associated with such fume chamber for the withdrawal of gases and vapours and burnt products of combustion.

U.S. Pat. No. 580,594 patented Aug. 4, 1959 by M. A. Naulin, provided an incinerator wall construction. That wall construction included a substantially-channel-shaped metal outer wall member and a cementitious refractory liner. Such liner was formed by interlocking sections.

U.S. Pat. No. 2,959,140 patented Nov. 8, 1960 by H. Friedberg, provided a smokeless and odourless incinerator having walls forming a furnace chamber, and a casing surrounding such chamber on all sides and spaced outwardly therefrom. An opening was provided in the upper end of the casing for the introduction of the charge to be consumed. A hollow combined burner shield and duct was disposed in the furnace chamber. An ash trap was also provided in the furnace chamber. Baffle means supported in the trap permitted only non-linear gaseous to flow through such baffle means. A secondary combustion device was positioned at the flue connection near the top of the upwardly-extending burner shield and duct. A maze of ceramic material was provided through which products of combustion had to pass from the furnace chamber to the flue connection. A small opening was provided for supplying combustion air to the secondary combustion device.

U.S. Pat. No. 3,098,458 patented July 23, 1963 by D. C. Lanty, Jr., provided a rotary refuse converter including the combination of a housing, a rotary converter extending longitudinally of the housing, burner means in the housing for heating the converter, means for rotating the converter, a fixed refuse inlet tube structure at one end of the converter, a fixed discharge receptacle and a charred refuse outlet tube at the other end of the converter, sealing means between the rotary converter and the discharge receptacle and sealing means between the rotary converter and the inlet tube structure to preclude escape of gases from the converter. An outlet pipe for recovered combustible gases from the converter extended from the discharge receptacle to the burner means. Sealing means were provided for the refuse inlet tube, and for the charred refuse outlet tube. Valves in the outlet pipe selectively directed a portion of the recovered combustible gases to the burner.

Canadian Patent Number 805,446 patented Feb. 4, 1969 by P. W. Spencer, provided incinerators and methods for smokeless incineration. That incinerator included means defining a combustion chamber, and a charging door defining an access means to the combustion chamber, and means operatively connected to the combustion chamber to exhaust the waste gases. Means were disposed above the charge of waste material for controlling the temperature of the portion of the charge on top of the burning portion of the pile of burning combustibles, the control means including a water spray nozzle extending into the chamber and above the burning charge of waste materials for modulating initial combustion of a new charge of waste combustibles. Means were responsive to the opening of the door for activating the spray nozzle. Means were provided for indicating when the temperature in the combustion chamber exceeded the distillation temperature of the combustibles.

Canadian Patent Number 688,561 patented June 9, 1969 by F. A. Lee et al, provided a fired heater. That heater included a pair of refractory faced side walls oppositely disposed each relative the other and embracing a chamber therebetween. Heating means were operatively associated with each of the side walls for heating the refractory so that radiation was emitted therefrom. A tube was disposed in the chamber, and means were provided for circulating a process fluid through the tube.

Canadian Patent Number 879,446 patented Aug. 31, 1971 by M. E. P. Hill, provided an incinerator for the combustion of materials. The patented incinerator included a refractory-lined, substantially cylindrical combustion chamber having a flue outlet coupled to one end thereof. Means were provided for feeding combustible material into the chamber. Means were provided for introducing forced air into the chamber. Means were provided for causing a stream of air to impinge upon the combustible material while entering the chamber. Means were also provided for controlling the flow of air into the chamber so that the rate of supply of air sufficed but did not substantially exceed that which was required for complete combustion of the combustible material within the combustion chamber.

U.S. Pat. No. 3,621,798 patented Nov. 23, 1971 by F. Pedersen, provided a furnace for the combustion and destruction of waste materials. The furnace had a combustion chamber and an adjustable heat source for supplying heat thereto. The furnace also had a refractory lining with means thereon for receiving the heat source. The combustion chamber was provided, in the region of the heat source, with a particularly defined inner sheet metal mantle. The refractory lining was provided with passages for the supply of combustion air, and the mantle had slots therein in communication with the passages.

U.S. Pat. No. 4,230,451 patented Oct. 28, 1980 by M. Chambe, provided an apparatus for the thermal treatment of a mass of organic materials. That apparatus included a horizontally elongated tank having a generally cylindrical bottom and formed with an inner wall of thermally-conductive material spaced from an outer wall of thermally-insulating material. A roof was hermetically sealed to the tank, the roof was provided with a sealable opening through which the mass could be introduced into the chamber. The tank was formed along the bottom thereof with a sealable outlet for discharging the thermally treated mass. A burner opened into the passage and sustained a flame adapted to generate hot air which traverses the passage along the inner wall to heat the mass. A duct was provided for feeding vapour evolved in the chamber to the burner and to supply the flame with the vapour. Temperature-sensing means responsive to the temperature in the chamber were provided for controlling the flame.

U.S. Pat. No. 4,289,079 patented Sept. 15, 1981 by G. K. Swistun, provided a sawdust burning furnace which included an inner shell, an outer shell disposed concentrically around the inner shell, a bottom member, a cover member, a lower horizontal channel interconnected therewith, and an exhaust aperture defined in the outer shell adapted for interconnection to a flue connector. A firebox was disposed inside the inner shell and was provided with air intake means. A bleeder tube interconnected the firebox through the walls of the inner and outer shells to the outside of the outer shell, and has air vent means disposed between the inner and outer shells, and means to provide air to the bleeder tube.

U.S. Pat. No. 4,495,873 patented Jan. 9, 1985 by E. B. Blankenship, provided an incinerator for burning odour-forming materials. The incinerator was made up of an inner housing located within an outer housing and which had spaced-apart walls forming an interior space therebetween. The inner and outer housings had aligned upper openings with insulated closure members. A central chamber extended from the upper opening of the inner housing to a lower position for receiving material to be burned. An upper chamber holding a heat activated odour reducing catalyst surrounded the upper portion of the central chamber. A gas collection chamber surrounded the upper chamber and an exhaust blower was provided for drawing gas from the central chamber to the interior space by way of the heat activated odour reducing catalyst and the collection chamber. A heater was provided for preheating the heat activated odour reducing catalyst. A second exhaust blower was provided for drawing gas from the interior space to the atmosphere. A main heater was located within the lower portion of the central chamber for burning the material deposited therein. An air inlet extended through the wall of the inner housing to the central chamber and a blower was provided for drawing air from the interior space into the central chamber. Air ducts extended into the interior space for providing air to support combustion and for cooling purposes.

Canadian Patent Number 1,205,683 patented June 10, 1986 by E. H. Benedick, provided a vertical flow incinerator having regenerative heat exchange. That thermal recovery incinerator included a plurality of adjacent, substantially-vertical gas-processing sections, each of which included heat exchange means and a cover for the section with apertures formed therein. A high temperature combustion chamber was disposed above the sections, and was in gas-flow communication therewith through the apertures.

U.S. Pat. No. 4,688,495 patented Aug. 25, 1987 by T. R. Galloway, provided a hazardous waste reactor system. The hazardous waste disposal system included a hollow high temperature cylindrical core defining a central reaction zone, a shell about the core and defining an annular space thereabout communicating with the reaction zone interior, and means for heating the core. Means directed a carrier gas in a flow through the annular space for preheating the gas and then through the reaction zone. Means were provided for continuously-inserting hazardous waste into the reaction zone and means were provided for removing reaction product from a bottom end of the reaction zone.

Many patents have also issued which were directed to methods and apparatus for the thermal decomposition of stable chemicals. Among these patents are the following:

U.S. Pat. No. 4,140,066 patented Feb. 20, 1979 by H. Rathjen et al, provided a process for the thermal decomposition of polychlorinated organic compounds, e.g., polychlorinated phenyls and biphenyls (PCB's). The process comprised heat treating the polychlorinated organic compounds in a flame, in a particularly-defined high-turbulence, combustion chamber.

Canadian Patent Number 1,164,631 patented Apr. 3, 1984 by O. D. Jorden, provided a system and apparatus for the continuous destruction and removal of polychlorinated biphenyls from fluids. That system included a mixing chamber, an agitator in the mixing chamber, a pump for feeding the fluid containing polychlorinated biphenyl into the mixing chamber, a heater for raising the temperature of the fluid to a predetermined temperature, and an injector for feeding a predetermined quantity of a reagent. A reaction chamber was operatively-connected to the mixing chamber for receiving the fluid containing the polychlorinated biphenyl and reagent from the mixing chamber. A separator separated the products of reaction between the polychlorinated biphenyl and reagent from the fluid leaving the reaction chamber. A degasser was provided for removing certain gases contained in the fluid and products of reaction leaving the separator means.

Canadian Patent Number 1,166,654 patented May 1, 1984 by G. Evans, provided an apparatus for PCB disposal. The apparatus included a substantially air-tight assembly which included at least one internal combustion engine for burning of a mixture of PCB liquids, fuel and air, and means for processing exhaust gases therefrom. Such means included either at least one gas scrubber supplied with water, and at least one gas scrubber supplied with fuel, or at least one adsorber tower with packing material which was adapted for the passage of gases and which was suitable for adsorption of organic contaminants.

Canadian Patent Number 1,169,883 patented June 26, 1984 by O. L. Norman, provided a method for destruction of polyhalogenated biphenyls. The method included the steps of reacting the polyhalogenated biphenyls at a high temperature in a solution in an inert liquid with a dispersion of sodium in a hydrocarbon oil.

U.S. Pat. No. 4,479,443 patented Oct. 30, 1984 by I. Faldt et al, provided an apparatus for thermal decomposition of stable compounds. The apparatus included a plasma generator for producing a high temperature plasma, means for feeding hazardous waste to and through the plasma generator, means for feeding sufficient oxidizing agents to the hazardous waste to permit the complete decomposition of the hazardous waste to stable products, and means for controlling the temperature of the plasma and the flow of hazardous waste through the plasma generator.

Canadian Patent Number 1,225,775 patented Aug. 18, 1987 by W. C. Meenan, provided a method for treating polychlorinated biphenyl contaminated sludge. The method included the steps of heating the material by exposure to hot gas in a heating means thereby separating the polychlorinated biphenyls from the material, and then conveying the separated polychlorinated biphenyls out of the heating means for further treatment.

Canadian Patent Number 1,230,616 patented Dec. 22, 1987 by Y. Kilamira, provided an apparatus for rendering polychlorinated biphenyl toxic free. The apparatus included a combustion furnace, a combustion vessel disposed in the combustion furnace, and a grid in the combustion vessel which divided the interior thereof into an upper and lower section. A PCB tank communicated with the lower section of the combustion vessel, for filling the combustion vessel. A burner and a fan were movable so as to be selectively placed in a position in opposition to an opening of the combustion furnace. A gas treatment tank communicated with the combustion furnace via an exhaust duct.

SUMMARY OF THE INVENTION (i) Aims of the Invention

While many waste disposal problems have been solved by the teachings of the above-identified prior patents, there are still many improvements which are desirable. In the above patents which taught combustion chambers of the direct-fired type, large volumes of contaminated flue gases were produced which must be processed in a secondary combustion chamber.

In the prior art waste combustion chambers which may be vented to the atmosphere or to secondary treatment chambers, a high concentration of undesirable toxic pyrolysis products, e.g., dioxins and furans were produced, which had to be further treated.

In the prior art waste combustion chambers, the problem of non-uniformity of temperature in the incinerator chamber resulted in lack of uniformity of combustion products.

Accordingly, an object of the present invention is to provide an improved hazardous waste combustion chamber in which the volume of contaminated gases which must be processed in a secondary combustion chamber is greatly reduced.

Another object of this invention is to provide an improved hazardous waste combustion chamber in which the concentration of undesirable toxic pyrolysis products, e.g., dioxins and furans is greatly minimized.

Yet another object of this invention is the provision of an improved hazardous waste combustion chamber in which the temperature within the incinerator chamber is uniformly controllable.

(ii) Statement of the Invention

By this invention, a hazardous waste incinerator is provided comprising: (i) a sealed inner incineration chamber, which is either made from, or which is lined with, a non-porous, impervious, corrosion-resistant material, the inner incineration chamber including means for supporting hazardous waste to be incinerated, and a recirculating blower; and (ii) an insulated outer combustion chamber in sealed, spaced-apart relationship to the inner incineration chamber; the outer combustion chamber always being out of communication with the inner incineration chamber.

By a first specific embodiment of this invention, a hazardous waste incinerator is provided comprising: (i) a base capable of horizontal movement on a transfer car and of vertical movement through the action of an elevator mechanism and including an insulated inverted domed floor, which is either made from, or which is lined with, a non-porous, impervious, corrosion-resistant material, and work support pad means; (ii) a stationary, elevated, inner incineration chamber, which is either made from, or which is lined with, a non-porous, impervious corrosion-resistant material, the incineration chamber including a domed roof, incineration-supporting air inlet means, products of incineration outlet means, and a recirculating blower mounted in the domed roof, the inner, incineration chamber being disposed around the work support pad means and around the recirculating blower, the inner incineration chamber being in sealable relationship to the base; and (iii) an insulated outer combustion chamber disposed around, and spaced apart from, the inner incineration chamber and being in permanently-sealed relationship to the inner incineration chamber to provide a combustion zone therebetween, the outer combustion chamber being provided with fuel inlet means, combustion air inlet means and products of combustion outlet means; the outer combustion chamber always being out of communication with the inner incineration chamber.

By a second specific embodiment of this invention, a hazardous waste incinerator is provided comprising: (i) a base supported on a pedestal; (ii) an inner incineration chamber which is either made from, or which is lined with, a non-porous, impervious, corrosion-resistant material, the inner incineration chamber enclosing, and being disposed around, pad support means, incineration-supporting air inlet means, products of incineration outlet means, and a recirculating blower mounted on the base, the inner incineration chamber being in sealed relationship to the base; and (iii) an insulated outer combustion chamber disposed around the inner incineration chamber, and being in sealed relationship to the base, the outer combustion chamber being provided with fuel inlet means, combustion air inlet means and products of combustion outlet means; the outer combustion chamber always being out of communication with the inner incineration chamber.

By a third specific embodiment of this invention, a hazardous waste incinerator is provided comprising: (i) an open-topped shell in the form of an insulated outer combustion chamber provided with fuel inlet means, combustion air inlet means, and combustion products outlet means; (ii) a pedestal supporting the outer combustion chamber; (iii) an upper support resting atop the open-topped vessel for closing-off the open-topped vessel, the support supporting a suspended inner incineration chamber which is either made from, or which is lined with, a non-porous, impervious, corrosion-resistant material, the inner incineration chamber including a floor, the floor being provided with incineration-supporting air inlet means, products of incineration outlet means and a recirculating blower; and (iv) a roof for the suspended inner incinerator chamber, the roof supporting a suspended pad support means, the roof resting atop the upper support in sealed relationship thereto; the outer combustion chamber always being out of communication with the inner incineration chamber.

By a fourth specific embodiment of this invention, a hazardous waste incinerator is provided comprising: (i) an insulated, rectangular parallelepiped shell having a vertically-movable front door, and providing an outer combustion chamber surrounding a rectangular parallelepiped inner incineration chamber, the outer combustion chamber being provided with fuel inlet means, combustion air inlet means and products of combustion outlet means and the inner incinerator chamber being either made from, or being lined with, a non-porous, impervious, corrosion-resistant material, the inner incinerator chamber also being provided with incineration-supporting air inlet means, products of incineration outlet means and a recirculating blower; and (ii) a false wall disposed interiorly within the inner incinerator chamber and resting on a pad support means, the false wall being provided with a plurality of apertures; the outer combustion chamber always being out of communication with the inner incineration chamber.

By a fifth embodiment of this invention, a method is provided for incinerating hazardous waste including the provision of an outer, heat-producing zone, and an inner incineration zone in which a charge of hazardous waste is fed only to the inner incineration zone, wherein the inner incineration zone is heated by means of heat from the outer combustion zone, the method comprising: providing the inner incineration zone as an impervious incineration having a continuous non-porous corrosion-resistant surface; providing the inner impervious incineration zone in sealed, spaced-apart and heat-conducting relation to the outer, heat-producing zone; and withdrawing products of incineration from the inner incineration zone which are separate and distinct from, and are not mixed with, products of combustion from the outer combustion chamber.

(iii) Other Features of the Invention

In one feature of the first embodiment of this invention the seals at the base preferably comprise "O"-ring seals provided with recirculation coolant means. The incineration-supporting air preferably passes through the gap formed between the inner chamber and the base, the gap being bounded on its outer periphery by the "O"-ring seal. The products of incineration outlet means passes through the walls of the inner incineration chamber and the outer combustion chamber and is concentric with the combustion outlet means. The products of combustion outlet means passes through the wall of the outer combustion chamber. The base preferably is vertically-movable from the inner incineration chamber to reveal the work support pad means. The base preferably is horizontally-movable from below the inner incineration chamber to provide ready access to the work support pad means.

In one feature of the second embodiment of the invention, the seals at the base preferably comprise "O"-ring seals provided with recirculation coolant means. The incineration-supporting air inlet means preferably passes through the pedestal, and the products of incineration outlet means passes through the base. The inner incineration chamber and the outer 15 combustion chamber preferably each have an upper domed roof. The outer combustion chamber preferably is vertically-movable from the base to reveal the inner incineration chamber, the inner incinerator chamber being vertically-movable to expose the work pad support means.

In one feature of the third embodiment of this invention, the seals at the upper support preferably comprise "O"-ring seals provided with recirculation coolant means. The incineration-supporting air inlet means preferably passes through the pedestal, and the products of incineration outlet means preferably passes through the base. The rest of the inner incineration chamber preferably is domed and is insulated behind the impervious, corrosion-resistant liner. The roof of the inner incinerator chamber is preferably vertically-movable to expose the suspended work pad support means.

In one feature of the fourth embodiment of the invention, the false wall rests on a plurality of "T"-shaped pad supports, and/or the false wall conceals electrical heaters.

(iv) Generalized Description of the Invention

The present invention in its broad sense provides a sealed, impervious, high-temperature, corrosion-resistant internal chamber within the heat-producing chamber. This represents a major improvement over the existing technology, since it precludes the commonly experienced diffusion of the high boiling, hazardous constituents, e.g., PCB's, dioxins and furans, into and through conventional ceramic linings. The escape of these materials has, in several instances, resulted in severe contamination of the surrounding environment.

The invention also provides separate incineration and indirect heating zones. Whereas incineration normally implies direct firing of the fuel within the same chamber as the contaminated charge, indirect firing, (referred to as roasting), is peculiar to systems employed in vaporization and pyrolysis. By this invention, however, several significant benefits are provided, including: a substantial reduction in the volume of contaminated gases, when compared with the direct fired system, which must be processed in the secondary combustion chamber; a reduction in the number and concentration of undesirable, toxic pyrolysis products, e.g., dioxins and furans, when compared with a roaster; and improved uniformity of temperature in the incineration chamber when compared with either of the traditional approaches.

Thus, the present invention provides a method and apparatus for the containment and incineration of hazardous organic solids and liquids. One specific adaptation of the invention applies to the decontamination of ASKAREL- and PCB-contaminated electrical transformers and capacitors.

In general terms, one specific embodiment of the hazardous waste incinerator includes a base which is capable of horizontal movement, e.g. on a transfer car having wheels rolling on a track. The base is also capable of vertical movement through the action of some type of elevator mechanism. The base is provided with an insulated, impervious, inverted domed floor, or an insulated impervious, inverted domed floor which is lined with a non-porous, corrosion-resistant liner. The base also includes a work support pad.

Such hazardous waste incinerator also includes a stationary, elevated, non-porous, impervious, incineration chamber, or a stationary, elevated, incineration chamber which is lined with a non-porous, impervious corrosion-resistant liner. The elevated inner incineration chamber is provided with a domed roof. It also includes an incineration-supporting air inlet and products of incineration outlet. A recirculating blower mounted in the domed roof is capable of generating a highly turbulent motion of gases in the incineration chamber, a controlled inlet port to permit flow of makeup air into the incineration chamber at a rate which will maintain the desired oxygen concentration in the effluent gas, a combustion gas outlet port and sealed ducting to a secondary stage of incineration, a water-cooled seal around the periphery of the inner chamber, and a pad for support of the transformer fragments. Such incineration chamber also includes a stationary, elevated, insulated, outer combustion chamber enclosing the inner incineration chamber. Burners or electric heating elements are associated with the outer combustion chamber, designed for rapid heat release in the annulus formed between the inner incineration chamber and the combustion chamber. This heat is then transferred, by radiation and convection, to the circulating gases in the incineration chamber and, ultimately, to the transformer fragments. All fuel, air and combustion gases emerging from the annulus are separately ducted away from the unit and precluded from mixing with the gases in the incineration chamber. An inducted draft is induced in the incineration chamber to ensure operation at a controlled, negative pressure, thereby substantially preventing the escape of hazardous, or otherwise noxious, gaseous chemical constituents. The necessary mechanisms, cables, rails, pulleys, gears and motors to permit access to and guided movement of the elements of the system are also provided.

When in operative association, the inner incineration chamber is disposed around the work support and the recirculating blower, with the inner incineration chamber being in sealed relationship to the base.

An insulated outer combustion chamber is disposed around and in a spaced-apart relationship from the inner incinerator chamber to provide a combustion zone. The insulated outer combustion chamber is in permanently sealed relationship to the inner incineration chamber. The outer combustion chamber is provided with a fuel inlet, with a combustion air inlet and with a products of combustion outlet.

The base and the inner incinerator chamber are each constructed of, or are lined with, a material which is impervious to the gases which are formed during the incineration, which is capable of withstanding temperatures of at least about 1100° C., and which is resistant to high-temperature corrosive attack by acid gases, in particular HCl. Materials of construction include, but are not limited to HAYNES ALLOY HR160 (Registered Trade-mark), or a solid ceramic, e.g. silicon carbide, or a ceramic-coated, high-temperature-alloy steel.

A second embodiment of the hazardous waste incinerator includes an internally-insulated, outer, bell-shaped chamber, open at the bottom and free of obstructions. An inner, bell-shaped incineration chamber, also open on the bottom is also provided, which is capable of forming a seal around the periphery of the opening. It is constructed of, or is lined with, a material which is impervious to the gases which are formed during the incineration, which is capable of withstanding temperatures of at least 1100° C., and which is resistant, at least on its inner surface, to high-temperature, corrosive attack by acid gases, in particular HCl. Materials of construction may include, but are not limited to, HAYNES ALLOY HR160 (Registered Trade-mark), or a solid ceramic, e.g., silicon carbide, or a ceramic-coated, high-temperature alloy steel. The inner bell may be a separate element or may be integrally-mounted to the outer, heating chamber. A pedestal-type platform is also provided which is equipped with a recirculating blower capable of generating a highly turbulent motion of gases in the inner incineration chamber, a controlled inlet port to permit flow of makeup air into the inner incineration chamber at a rate which will maintain the desired oxygen concentration in the effluent gas, a products of combustion outlet port and sealed ducting to a secondary stage of incineration, a water-cooled seal around the periphery of the inner chamber, and a pad for support of the transformer fragments. Burners or electric heating elements are associated with the outer combustion chamber, designed for rapid heat release in the annulus formed between the inner incineration chamber and the outer combustion chamber. This heat is then transferred, by radiation and convection, to the circulating gases in the inner incineration chamber and, ultimately, to the transformer fragments. All fuel, air and combustion gases emerging from the annulus are separately ducted away from the unit and precluded from mixing with the gases in the inner incineration chamber. An inducted draft is induced in the inner incineration chamber to ensure operation at a controlled, negative pressure, thereby substantially preventing the escape of hazardous, or otherwise noxious, gaseous chemical constituents. The necessary mechanisms, cables, rails, pulleys, gears and motors to permit access to and guided movement of the elements of the system are also provided.

A third embodiment of the hazardous waste incinerator is similar to the second embodiment described above, except that the bells are inverted and are integrally-mounted to form a single unit comprising a central incineration chamber cavity and an annular heating chamber. The double bell unit is held stationary while the transformer fragment support pad is suspended below a movable lid which, when lowered into engagement with the double bell unit, forms a seal for the incineration chamber. All ducts, heating elements and air intakes are associated with the stationary components.

A fourth embodiment of the hazardous waste incineration, consists of an insulated chamber, totally enclosed except for one end wall which is completely open and free of obstructions. An inner, impervious, corrosion-resistant lining, which may be either a metal (e.g., HAYNES ALLOY HR160) or ceramic-coated alloy steel or a ceramic (e.g., silicon carbide), which is sealed at all joints to preclude the escape of any vapours, and which is sufficiently resistant to chemical attack at high temperature to endure exposure to the incineration environment encountered during operation. An insulated door is provided as the third element, which is lined on the inner surface, which fully covers the end wall opening, which is equipped with the necessary seals and pressuring mechanisms to create an air-tight seal at the periphery of the incinerator opening, and which is provided with the cables, rails, gears, pulleys and motors to permit guided vertical or horizontal movement away from the opening. A recirculating blower is provided as the fourth element, to ensure highly turbulent movement of the gases in the inner incineration chamber, thereby ensuring a high heat transfer rate between the heating elements and the load under treatment, as well as satisfactory mixing of combustion air and combustible organics evolved from the load. A number of electric or fire tube heating elements are provided which extend into outer combustion chamber. In the latter instance, all of the fuel, air and combustion gases present in the fire tubes are separately ducted away from the unit, and are precluded from mixing with the gases in the inner incineration chamber. The heating elements may be integral with the wall or may be freely suspended. Moreover they may be horizontally- or vertically-oriented. Appropriate baffles, deflectors and false walls and ceiling are provided to control the path of the circulating gases in the incineration chamber, thereby ensuring a uniform chamber temperature and enhanced heat transfer between the heating elements and the load under treatment. The lower section of the deflector mechanism also provides protection of the lining against physical damage during loading and unloading of the incinerator. Means are included for providing an induced draft in the incineration chamber to ensure operation at a controlled negative pressure, thereby preventing the escape of hazardous, or otherwise noxious, gaseous chemical constituents. Control louvres are provided to permit flow of makeup air into the incineration chamber at a rate which will maintain the desired oxygen concentration in the effluent gases. Finally, sealed heat traced ducting is provided to transport the gases from the incineration chamber to a high temperature, secondary combustion chamber which will ensure the complete destruction of residual hazardous contaminants.

BRIEF DESCRIPTION OF THE DRAWINGS

In the accompanying drawings.

Figure 1:
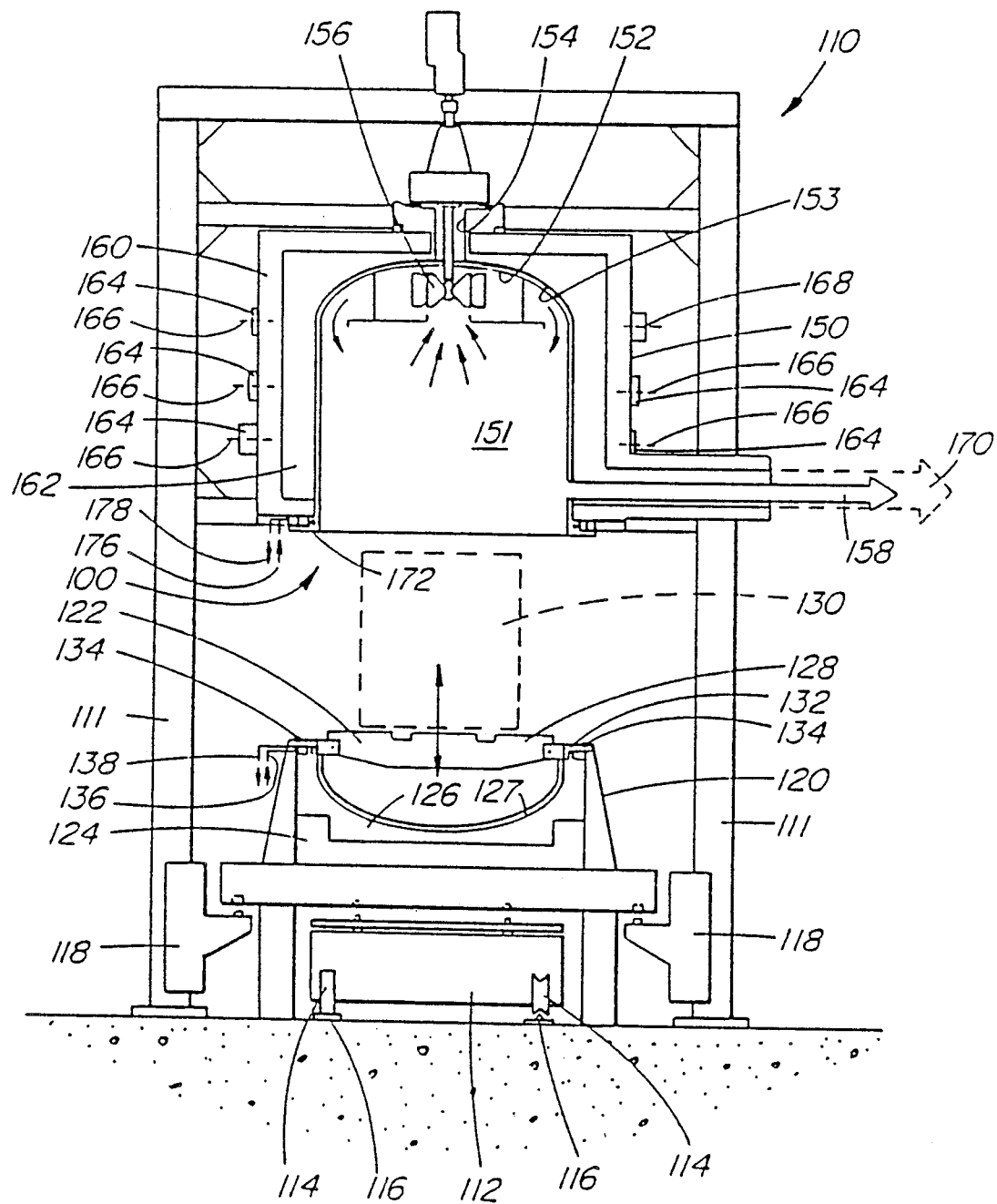
FIG. 1 is a central longitudinal cross-section through one embodiment of the hazardous waste incinerator of this invention.

DESCRIPTION OF PREFERRED EMBODIMENTS (i) Description of FIG. 1

As seen in FIG. 1, mounted within a generally rectangular parallelpiped open framework 110 is a hazardous waste incinerator 100 of a first preferred embodiment of this invention which includes a lower base section 120 and an upper combustion section 150. The lower base section 120 includes an open topped chamber 122 including an outer floor 124 having an inverted dome-shaped insulation 126 thereon, the upper exposed surface of such insulation being covered with an impervious, non-porous and corrosion-resistant liner 127. The lower base section 120 is mounted on a transfer car 112 having wheels 114 rolling on rails 116. The transfer car 112 is engageable by an elevator 118, vertically moveably-mounted on the vertical posts 111 of the open framework 110.

The open-topped chamber 122 is provided with a work support pad 128 to support a load 130 to be incinerated. The exposed peripheral or perimetral upper surfaces on rim 132 of the open-topped chamber 122 includes a liquid-cooled "O"-ring seal 134 fed with liquid coolant circulating therethrough via inlet line 136 and outlet line 138.

The upper combustion section 150 is stationary and is elevated. The incineration chamber 151 of this upper combustion section 150 has an exposed inner surface 153 which is impervious, non-porous and corrosion resistant. The incineration chamber 151 is provided with a domed roof 152. Descending through a sealed aperture 154 in the domed roof 152 is a recirculating blower 156 which inducts the incineration products upwardly in the central core, as shown by the "up" arrows, and discharges them downwardly along the sidewalls as shown by the "down" arrows. The incineration products from within incineration chamber 151 are vented or expelled through incineration chamber flue 158.

The incineration chamber 151 is surrounded by a heat insulated outer combustion chamber 160 formed of steel lined with a refractory material. The combustion chamber 160 is provided in permanently sealed relationship to the incineration chamber 151 to provide a combustion zone 162 therebetween. The outer combustion chamber 160 is provided with suitable burners 164, which are arrayed around the outer combustion chamber, and which may be either fuel oil burners fed with fuel oil through fuel oil inlet lines 166, or gas burners fed with gas through gas inlet line 166. The fuel is mixed with combustion air at the burners 164. The relatively clean products of combustion produced in combustion zone 162 are expelled through combustion chamber flue 170 which is concentric with incinerator chamber flue 158.

The lower peripheral rim 172 of the upper chamber is provided with a liquid coolent for the "O"-ring seals 134 which is fed with liquid-coolent circulating therethrough, via inlet line 176 and outlet line 178.

In its operative position, the rims 132 and 172 are in sealing contact with one another through "O"-ring seal 134 and form a gap through which the incineration air enters the incineration chamber 151.

Figure 2:
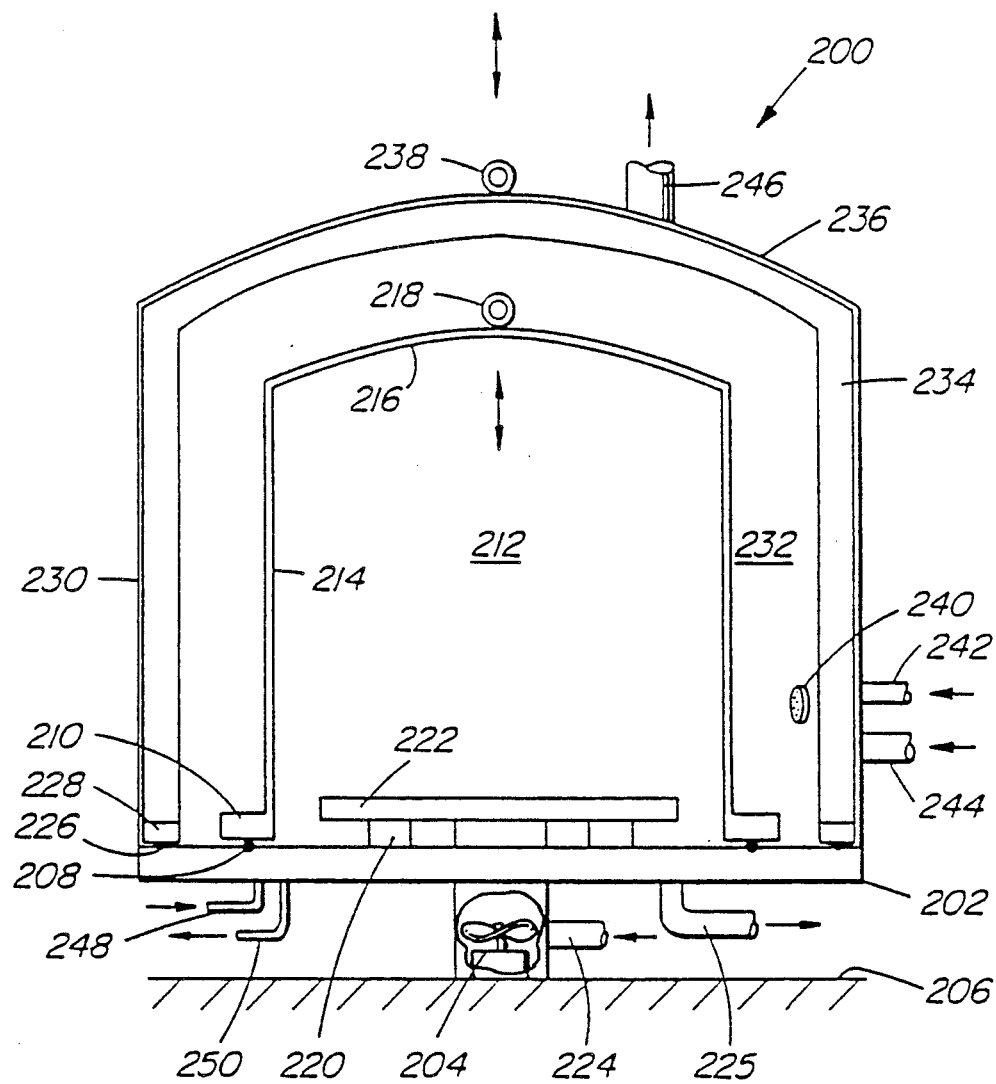
FIG. 2 is a central longitudinal cross-section through a second embodiment of the hazardous waste incinerator of this invention.

(ii) Description of FIG. 2

As seen in FIG. 2, the hazardous waste incinerator 200 is supported on a circular base platform 202 which is situated atop a hollow cylindrical pedestal 204 supported on the ground 206.

Supported in sealing engagement with an inner, liquid cooled "O"-ring seal 208 is the annular rim 210 of an inner incineration chamber 212, which is impervious and/or may be lined with lining 214 as previously described in the general description of the invention. The inner incineration chamber 212 is provided with a domed roof 216 and is surmounted by an eye 218 in order to be able to raise and lower (as shown by the double arrow) the inner incineration chamber 212 by means (not shown) but which are well-known to those skilled in the art.

Within the inner incineration chamber 212 and resting on a hollow cylindrical vented support 220 is a pad support 222. Within the hollow cylindrical vented support 220 is a recirculatory blower (not seen), which draws up incineration-supporting air through inlet conduit 224 and expels products of incineration through exhaust conduit 225, for discharge to a secondary combustion chamber (not shown) of known construction which forms no part of the present invention.

Supported in sealing engagement with an outer, liquid cooled "O"-ring seal 226 is the annular base 228 of an outer combustion chamber 230, which is spaced-apart from the inner incinerator chamber by a surrounding combustion zone 232. The outer combustion chamber 230 is provided with heat insulation 234, as previously described in the general description of the invention. The outer combustion chamber 230 is provided with a domed roof 236 and is surmounted by an eye 238 in order to be able to raise and lower (as shown by the double arrow) the outer combustion chamber 230 by means (not shown) well-known to those skilled in the art.

The outer combustion chamber 230 is provided with a burner 240, either a fuel oil burner fed with fuel oil through fuel inlet line 242, or a gas burner fed with gas through fuel inlet line 242. The burner is also fed with combustion air through air inlet line 244. The relatively clean products of combustion produced in the combustion zone 232 are expelled through flue gas outlet conduit 246.

"O"-ring seals 208 and 226 are cooled with liquid coolant circulating through the platform 202 and inlet line 248 and outlet line 250.

The outer combustion chamber 230 and the inner incineration chamber 212 may be combined into an integrated component by replacing the separate annular ring 210 of the incineration chamber 212 and the annular base 228 of the combustion chamber 230 with a single common ring mounted in permanent sealing engagement with both chambers.

Figure 3:
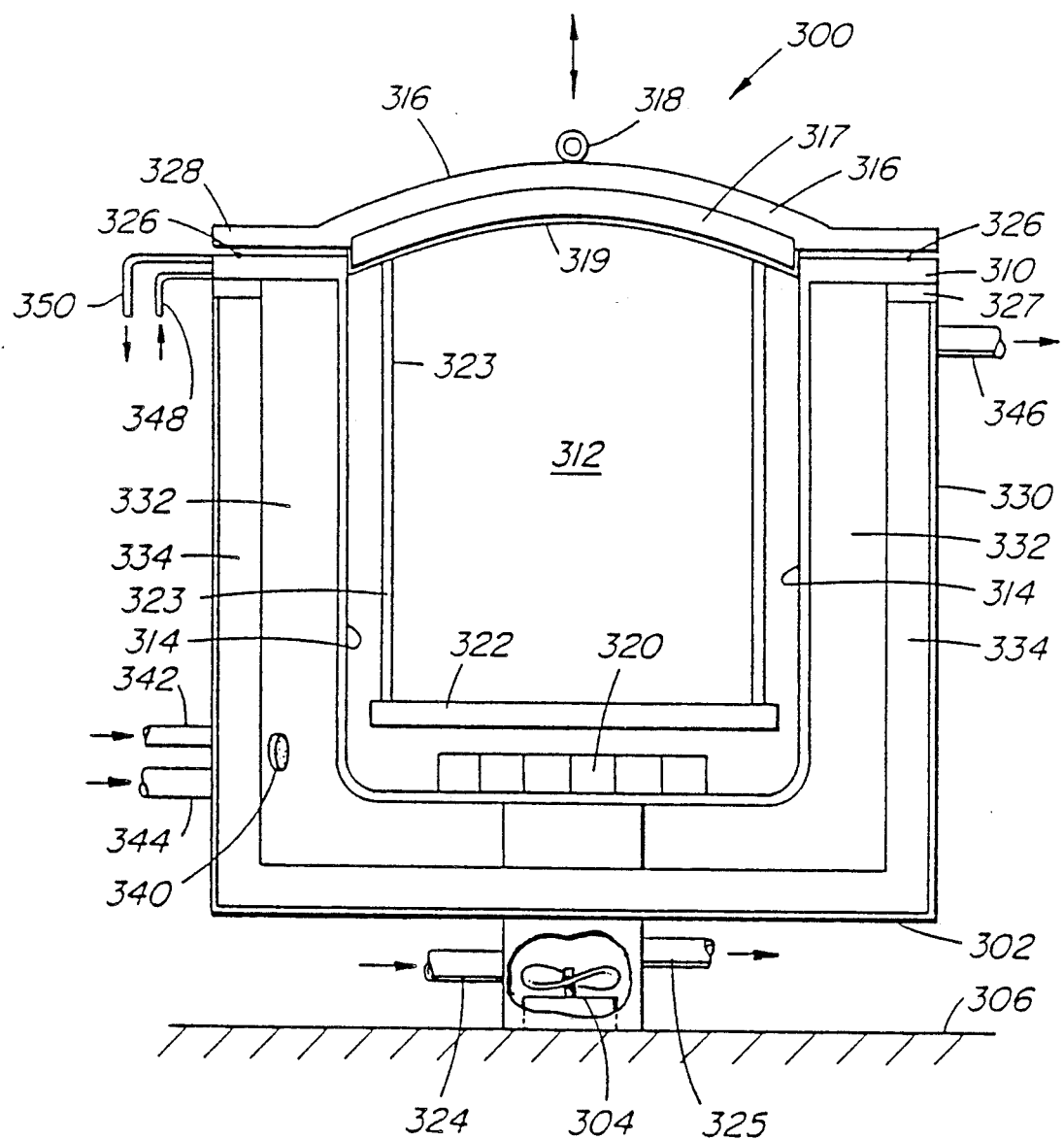
FIG. 3 is a central longitudinal cross-section through a third embodiment of the hazardous waste incinerator of this invention.

(iii) Description of FIG. 3

As seen in FIG. 3, the hazardous waste incinerator 300 includes an outer combustion chamber 330 having a lower circular base platform 302 which is situated atop a hollow cylindrical pedestal 304 supported on the ground 306.

The outer combustion chamber 330 is provided with heat insulation 334, as previously described in the general description the invention.

The outer combustion chamber 330 is also provided with a burner 340, either a fuel oil burner fed with fuel oil through fuel inlet line 342, or a gas burner fed with gas through fuel inlet line 342. The burner is also fed with combustion air through air inlet line 344. The relatively clean products of combustion produced in the combustion zone 332 is expelled through flue gas outlet conduit 346.

An inner incineration chamber 312 is secured to, and suspended within, outer combustion chamber 330 by annular rim 10 fixed to the upper rim 327 of the outer combustion chamber 30. The inner incineration chamber 312 is heat-resistant and, if necessary, may be provided with, a non-porous, corrosion-resistant, impervious liner 314. The zone surrounding the inner incineration chamber 312, as far as the insulation 334 of the outer combustion chamber 330, provides a combustion zone 32.

Supported in sealing engagement with a liquid cooled "O"-ring seal 326 on the annular rim 310 is the annular base 328 of the domed roof 316 of the inner incineration chamber 312. The domed roof 316 is provided with insulation 317 which is isolated from the incineration chamber atmosphere by the impervious, corrosion-resistant liner 319. The outer face of the domed roof 316 is surmounted by an eye 318 in order to raise and lower (as shown by double arrows) the roof 316.

Resting on the base of the inner incinerator chamber 312 is a vented support 320 within which is a recirculating blower (not seen) which draws up incineration-supporting air through inlet conduit 324, and expels the products of incineration through exhaust conduit 325 for discharge to a secondary combustion chamber (not shown) of known construction which forms no part of the present invention.

A pad support 322 is suspended from the interior of the domed roof 316 by means of a plurality of suspension rods 323.

"O"-ring seals 326 are cooled with liquid coolant circulating through the annular ring 310 via inlet line 348 and outlet line 350.

Figure 4:
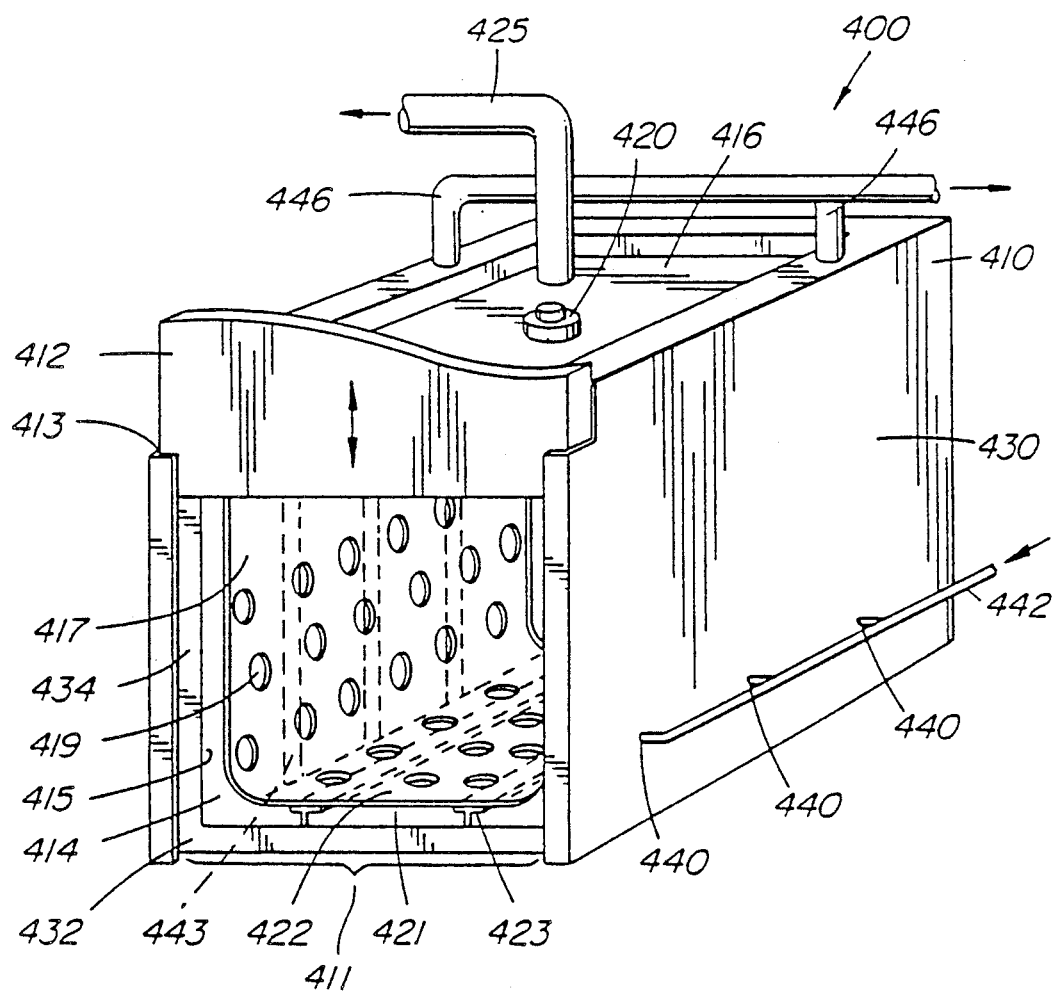
FIG. 4 is a front isometric view of a fourth embodiment of the hazardous waste incinerator of this invention.

(iv) Description of FIG. 4

As seen in FIG. 4, the hazardous waste incinerator 400 is in the form of a generally rectangular parallelepiped 410 having an open front 411 provided with a vertically-sliding door 412 (shown by the double arrow), which is in sliding-sealed-engagement with vertical slots 413 in the open front. The interior walls thereof are provided with heat insulation 434 to provide an outer combustion chamber 430.

Suspended from the interior of the roof 416 of the parallelepiped 410 is an inner incineration chamber 414, provided with an impervious lining 415. The inner incineration chamber 414 is separated from the outer combustion chamber 430 in order to provide a combustion zone 432 therebetween. To provide combustion, a plurality of burners 440 may be provided, which are fed with a fuel/air mixture through inlet line 442. Alternatively, a plurality of vertically-arranged, electrically-heated fire tube exchangers 443 may be provided to form the combustion zone. The products of combustion are withdrawn by outlet line 446 to a flue stack.

Within the inner incinerator chamber 414 is a false wall 417 provided with a plurality of apertures 419. The bottom 421 of the false wall rests on a pair of horizontally-oriented "T"-beams 423 to provide a pad support 422.

A recirculating blower 420 is provided on the outer roof 416, the blower serving to circulate ambient air as incineration-supporting air, and vents products of incineration to a secondary combustion chamber through exhaust conduit 425.

OPERATION OF PREFERRED EMBODIMENTS

The use of the apparatus of embodiments of this invention is as follows:

In preparation for charging a transformer to the incinerator, the transformer is disassembled by removal of the core from the casing. A large core may be bisected or even further reduced in size to facilitate heat transfer and the escape and oxidation of the organic components, e.g., PCB's, mineral oils, and the paper laminations.

The transformer casing and the various core fragments are then loaded on the pad and, depending on the incineration configurations adopted, either deposited on the work support pad, or on the pedestal platform or inserted into the rectangular incinerator by means of a fork lift truck, or other suitable transporting mechanism. The incineration chamber is then closed. With the elevator system (shown in FIG. 1) this is accomplished by moving the base upwardly to achieve sealing engagement with the upper, stationary bell and combustion chamber section. With the bell-shaped system (shown in FIG. 2), this is accomplished by placing the inner and outer bells into sealing engagement with the pedestal. With the inverted, bell-shaped, system (shown in FIG. 3), this is accomplished by lowering the domed roof to achieve sealing engagement with the annular rim of the incineration chamber. The incineration chamber of the rectangular incineration (shown in FIG. 4) is secured by closing and sealing the door. The heating elements are activated and the recirculating blower is set into motion. The temperature of the furnace is controlled through manipulation of the energy input to the heating elements and is maintained at a level below the melting temperature of the metallic components in the charge (i.e., less than 1000° C.). The flow rate of combustion air through the incineration chamber is controlled to maintain the desired oxygen content in the effluent to the secondary combustion chamber. There should be very efficient circulation of such air to provide turbulent mixing. Suitable flow rates are between about 10,000 and about 20,000 c.f./minute for an incineration chamber of approximately 100 cubic feet volume. The oxygen content of the exhaust from the incineration chamber is desirably from about 5 to about 15% by volume.

The transformer components are allowed to remain in the incinerator for a length of time which is sufficient to attain the centre-core temperature required to affect virtually complete destruction and/or removal of all organic constituents. While the time required will depend on the size and configuration of the core and the centre-core temperature desired, it will generally range from about 90 minutes to about 240 minutes.

EXAMPLES (i) Theoretical Considerations

The batch transformer decontamination furnace has been subjected to preliminary, theoretical and/or experimental testing to provide evidence to confirm that the system will function reliably under the imposed operating conditions and will achieve the desired level of metal decontamination and reclamation in a cost effective manner. It has been found that the following are of particular concern, namely: an appropriate metal or internal lining material for the furnace should be selected which is impervious to diffusion of hazardous vapour emissions, capable of withstanding high temperature corrosive chemical attack and sufficiently durable to survive the levels of abuse normally encountered in service; an incinerator air recirculating system must be provided which will ensure efficient heat transfer between the externally-fired heat exchanger and the transformer components and which will provide the oxygen required for combustion of the various primary organic constituents and pyrolysis products emanating from the transformer carcass; the minimum time required to elevate the temperature of the most remote internal regions of the core to the desired level, and the time and temperature required to ensure complete removal of the noxious organic materials from transformer components must be accurately determined.

(ii) Experiments

An experimental evaluation of the efficacy of this method, with the aid of a batch-type kiln, has demonstrated that the transformer core fragments can be adequately decontaminated, at acceptable temperature levels and in a reasonable period of time. The results of this evaluation and an experimentally-verified mathematical model of the response of the centre-core temperature, are now provided.

A series of experiments were conducted with the aid of a Von Roll kiln at the plant site, operating in the stationary mode to simulate the proposed transformer decontamination facility, in order to determine the furnace temperature and treatment period required to achieve a residual PCB contaminant level of less than 2 ppm. (It should be noted that the specification is considerably below the 50 ppm concentration permitted in most political jurisdictions for landfilling of decontaminated transformers. However, since it is intended to recycle the recovered metals, it is essential that the residuals be considered acceptable by potential purchasers of the salvage). The experiments were also designed to establish a theoretically-based, empirical correlation between the properties and dimensions of the core and the time required to achieve the specified temperature at the most remote location within the core. This correlation must be structured in such a form as to permit the reliable estimation of the treatment time required for any core segment of known properties and dimensions.

EXPERIMENTAL PROCEDURE

A) With respect to the first objective, a number of transformer cores of various sizes were extracted from drained transformer casings, bisected, and treated in the kiln for periods of time ranging from 90 minutes to 180 minutes. Samples obtained from the cores, both before and after treatment, were subjected to a standard laboratory analysis to determine the PCB removal efficiency affected by the thermal treatment.

The results obtained from those experiments which were concerned with the speed and extent of PCB removal are presented below in Table 1.

TABLE 1

DECONTAMINATION OF CORE SEGMENTS @ 1000° C. FURNACE TEMPERATURE

| CORE 3 | WEIGHT | TIME | PCB BEFORE | PCB AFTER |
|---|---|---|---|---|
| 87-307B | 5.0 kg. | 90 min. | 10,699 ppm | 2.2 ppm |
| 87-303A | 4.0 kg. | 165 min. | 40,286 ppm | 0.04 ppm |
| 87-337A | 27.4 kg. | 180 min. | 10,596 ppm | 0.86 ppm |
| 87-337B | 28.8 kg. | 90 min. | 18,436 ppm | 0.06 ppm |

These results suggest that:

(i) For core segments, ranging in weight from 4 to 30 kg, exposure to a temperature of approximately 1000° C. for a period exceeding 90 minutes is sufficient to affect a reduction in PCB concentration to prescribed levels, regardless of the initial concentration; and (ii) The residual contamination, following thermal treatment, appears to be more dependent upon the configuration of the core segment than on the initial PCB concentration. Thus, most probably as a consequence of its densely packed structure, segment No. 87-307B, which is among the smallest of the group treated, exhibits the highest residual PCB contamination.

B) In order to secure the data required for the development of a dynamic thermal response model, a thermocouple, installed at the centre of a core segment, was used to measure the temperature transient when the segment, initially at a temperature of 27° C., was inserted into the preheated, stationary kiln and, thereby, subjected to a step change in ambient temperature to approximately 965° C.

Figure 5:
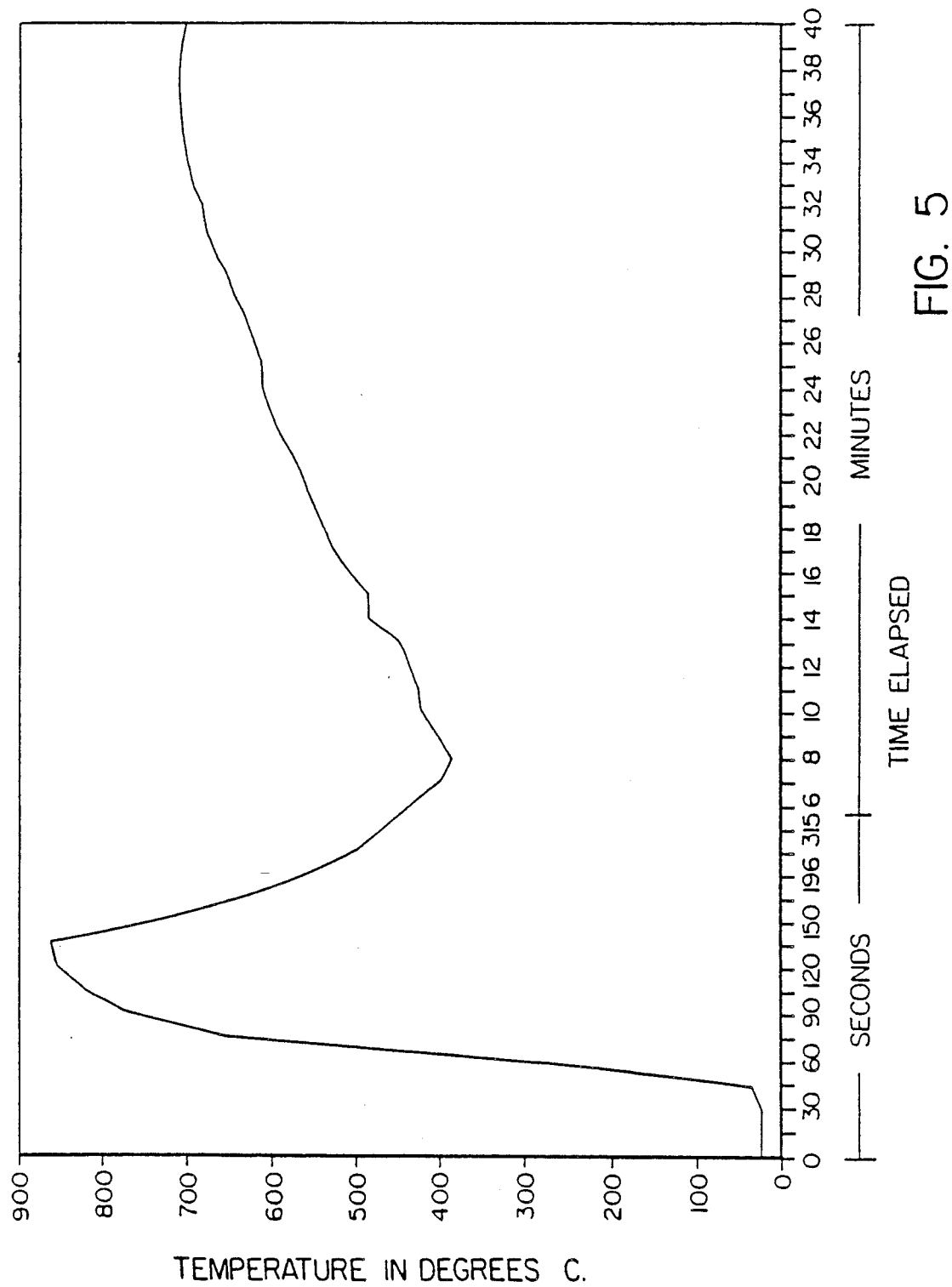
FIG. 5 is a core segment thermal response data graph showing temperature in degrees C as ordinate and time elapsed in minutes as abscissa.

The rather unusual, bi-modal temperature response recorded at the centre of the thermocouple-equipped, core segment is depicted in FIG. 5. The initial, steep temperature rise and first maximum are likely due to the rapid combustion of the paper laminations and associated organic liquids characterized by relatively low ignition temperatures. It might be expected that a considerable portion of the less strongly adsorbed PCB would be vaporized during this phase.

The thermal response of the metallic bulk of the core segment is most accurately described by that region of the curve which extends to the right, beyond approximately 10 minutes of elapsed treatment time, and which might be extrapolated toward the origin, at the left, in a continuous downward fashion.

Based on smoothed data derived from FIG. 5, it is possible to develop an entirely empirical relationship which would be useful in predicting the response of similar core segments, provided that differences in size and configuration were small. A more satisfactory approach involves development of a predictive model, based on theoretical considerations, which can then be evaluated through comparison with the measured response. It is this latter strategy which has been chosen and which will now be described.

If it assumed that surface resistance to heat transfer is small, the general differential equation for transient heat conduction, derived from the basic Fourier equation, when combined with a heat balance and applied to the core segment geometry, which may be adequately described as comprising an infinite slab (characterized by a very large ratio of heat transfer surface area to core thickness), may be solved to yield a rapidly converging infinite series of the form:

$$\frac{t_f - t_x}{t_f - t_i} = \frac{4}{\pi}\left( e^{-[\{\frac{\pi}{2}\}^2\{\frac{\alpha\theta}{x^2}\}]} \sin\left(\frac{\pi}{2}\right) + \frac{1}{3} e^{-[9\{\frac{\pi}{2}\}^2\{\frac{\alpha\theta}{x^2}\}]} \sin\left(\frac{3\pi}{2}\right) + \frac{1}{5} e^{-[25\{\frac{\pi}{2}\}^2\{\frac{\alpha\theta}{x^2}\}]} \sin\left(\frac{5\pi}{2}\right) + \ldots \right)$$

where:
$t_x$ = instantaneous temperature at the midpoint of the core segment
$t_f$ = final temperature at the mid-point (assumed to be 750° C. on the basis of the extrapolated curve)
$t_i$ = initial core segment temperature (27° C.)
$\theta$ = time since insertion of core segment into kiln
$\alpha$ = thermal diffusivity of solid $$\left(\frac{k}{\rho C_p}\right)$$

where:
k = thermal conductivity
$\rho$ = density
Cp = specific heat
x = distance from the heat transfer surfaces to the mid-point of the core (one inch)

If it is, reasonably, assumed that the resistance to heat transfer is primarily within the laminations between the copper coils and that the laminations consist primarily of flakes of charcoal after the initial combustion phase, the thermal diffusivity may be approximated on the basis of the following properties of charcoal:

Thus, since
k = 0.051 BTU (ft)/hr (°F.) $ft^2$
and
$\rho$ = 15 lbs/$ft^3$
and
Cp = 0.24 BTU/lb (°F.)
the thermal diffusivity is:

Following substitution of the known parameters, the foregoing equation may be reduced to the form:

$$t_x = 1380 - 1655\left( e^{-\{5\theta\}} - \frac{1}{3} e^{-\{45\theta\}} + \frac{1}{5} e^{-\{125\theta\}} \right)$$

Figure 6:
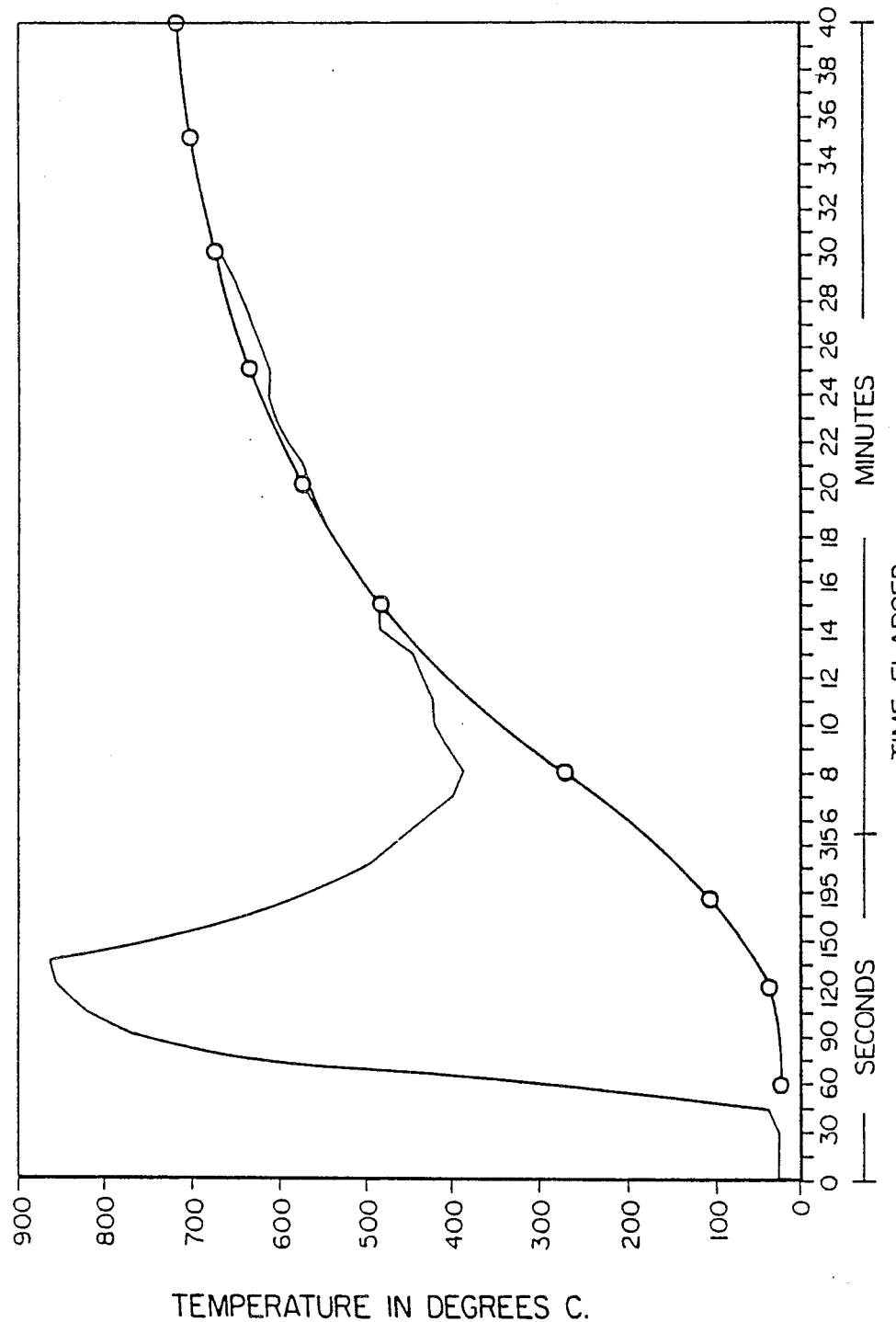
FIG. 6 is a core segment thermal response simulation graph showing temperatures in degrees C as ordinate and time elapsed in minutes as abscissa.

The indicated relationship between midpoint temperature and elapsed time is plotted on FIG. 6, and demonstrates the remarkable correlation between the actual and theoretically predicted response over the time period of particular interest.

Having confirmed the validity of the mathematical model, it is now desirable to rearrange the equation in the following form:

$$\theta = -28.95 \ln\{0.785\{1-F\}\}\{x\}^2$$

where:

$F$ = the fraction of the total mid-point temperature rise attained at time $\theta$ $$= \frac{t_x - t_i}{t_f - t_i}$$

which permits calculation of the time required to achieve any desired fraction of the total temperature rise at the midpoint of a core segment of thickness, 2x.

Figure 7:
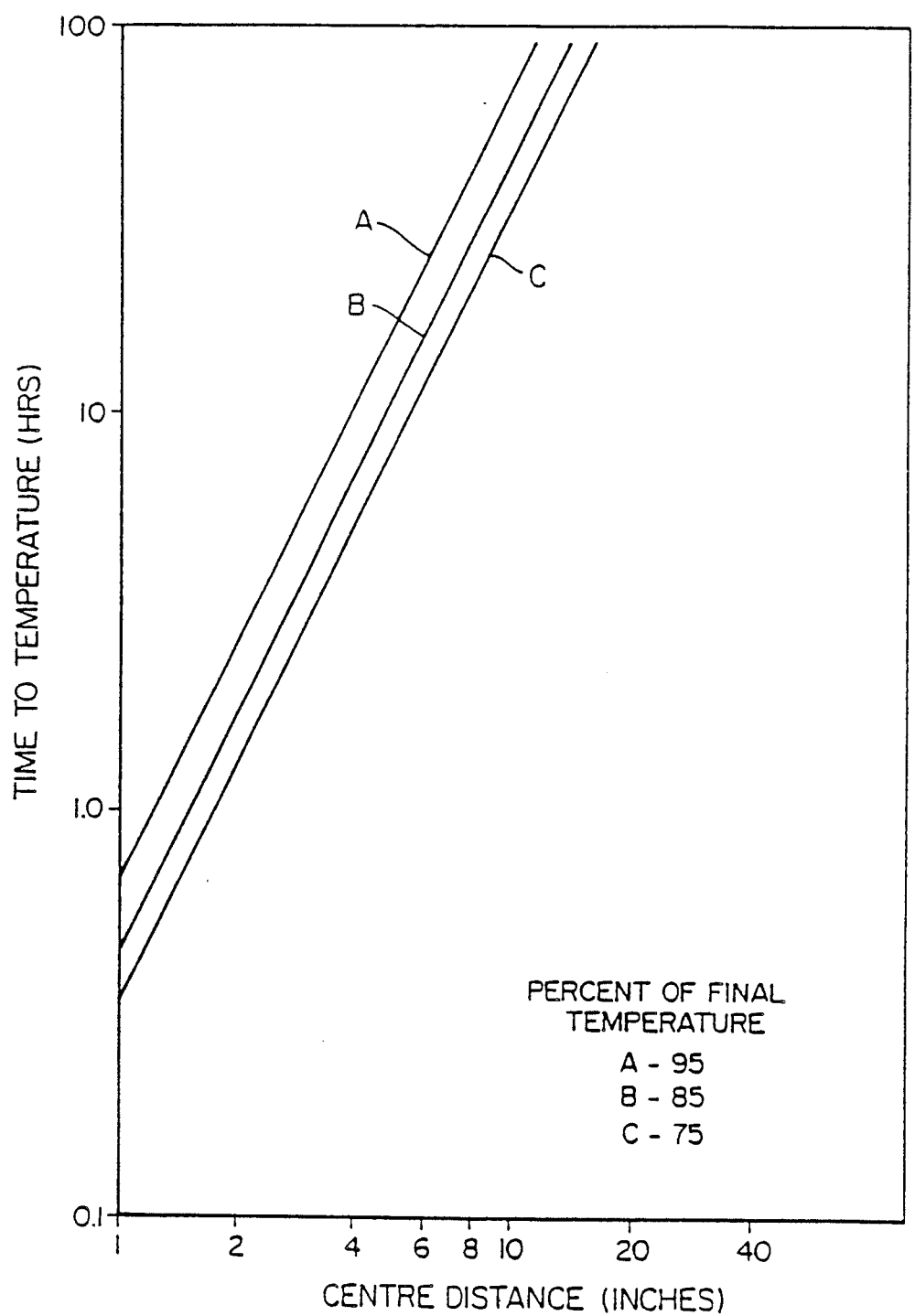
FIG. 7 is a time to temperature vs. centre distance graph showing the correlation between time to temperature in hours as ordinate and centre distance in inches as abscissa.

For convenience, this relationship may be plotted, at selected fractional temperature rises, as illustrated in FIG. 7.

While it is unlikely that the thermal diffusivity of the complex core matrix is precisely that of powdered charcoal, it is surprising that there is this apparent accuracy. However, from a practical point of view, the utility of the correlation is fortuitous. In view of the excellent correspondence of the shape of predicted and actual response curves, the form of the fusivity, $\alpha$, may be considered as purely an empirically-derived coefficient.

CONCLUSION

From the foregoing description, one skilled in the art can easily ascertain the essential characteristics of this invention, and without departing from the spirit and scope thereof, can make various changes and modifications of the invention to adapt it to various usages and conditions. Consequently, all such changes and modifications are properly, equitably, and "intended" to be, within the full range of equivalence of the following claims.

What I claim is:

1. A hazardous waste incinerator comprising:
   (i) a sealed inner incineration chamber, which is either made from, or which is lined with, a non-porous, impervious, corrosion-resistant material, said incineration chamber including means for supporting hazardous waste to be incinerated, and a recirculating blower;
   and
   (ii) an insulated outer combustion chamber in sealed, spaced-apart relationship to said inner incineration chamber;
said outer combustion chamber always being out of communication with said inner incineration chamber.

2. A hazardous waste incinerator comprising:
   (i) a base capable of horizontal movement on a transfer car and of vertical movement through the action of an elevator mechanism and including an insulated inverted domed floor, which is either made from, or which is lined with, a non-porous, impervious, corrosion-resistant material, and work support pad means;
   (ii) a stationary, elevated, inner incineration chamber, which is either made from, or which is lined with, a non-porous, impervious, corrosion-resistant material, said incineration chamber including a domed roof, incineration-supporting air inlet means, products of incineration outlet means, and a recirculating blower mounted in said domed roof, said inner incineration chamber being disposed around said work support pad means and around said recirculating blower, said relationship to said base;
   and
   (iii) an insulated outer combustion chamber disposed around, and spaced apart from, said inner incineration chamber and being in permanently-sealed relationship to said inner incineration chamber to provide a combustion zone therebetween, said outer combustion chamber being provided with fuel inlet means, combustion air inlet means and products of combustion outlet means;
said outer combustion chamber always being out of communication with said inner incineration chamber.

3. The hazardous waste incinerator of claim 2 wherein said incineration-supporting air inlet passes through a gap formed between said inner incineration chamber and said base, and said inner incineration chamber being provided with an outer peripheral "O"-ring seal.

4. The hazardous waste incinerator of claim 2 wherein the products of incineration outlet means passes through walls of said incinerator chamber and walls of said outer combustion chamber and is concentric with said products of combustion outlet means.

5. The hazardous waste incinerator of claim 2 wherein the products of combustion outlet means passes through walls of said outer combustion chamber.

6. The hazardous waste incinerator of claim 2 wherein said base is vertically movable from said inner incineration chamber to reveal said work support pad means.

7. The hazardous waste incinerator of claim 2 wherein said base is horizontally movable from below said inner incineration chamber to provide ready access to said work support pad means.

8. A hazardous waste incinerator comprising:
   (i) a base supported on a pedestal;
   (ii) an inner incineration chamber which is either made from, or which is lined with, a non-porous, impervious, corrosion-resistant material, said inner incineration chamber enclosing, and being disposed around, pad support means, incineration-supporting air inlet means, products of incineration outlet means, and a recirculating blower mounted on said base, said inner incineration chamber being in sealed relationship to said base;
   and
   (iii) an insulated outer combustion chamber disposed around said inner incineration chamber, and being in sealed relationship to said base, said outer combustion chamber being provided with fuel inlet means, combustion air inlet means and products of combustion outlet means;
said outer combustion chamber always being out of communication with said inner incineration chamber.

9. The hazardous waste incinerator of claim 8, wherein said seals at said base comprise "O"-ring seals provided with recirculation coolant means.

10. The hazardous waste incinerator of claim 8 wherein said incineration-supporting air inlet means passes through said pedestal and wherein said products of incineration outlet means passes through said base.

11. The hazardous waste incinerator of claim 8 wherein said inner incineration chamber and said outer combustion chamber each have an upper domed roof.

12. The hazardous waste incinerator of claim 8 wherein said outer combustion chamber is vertically-movable from said base to reveal said inner incineration chamber, and wherein said inner incineration chamber is vertically-movable to expose said pad support means.

13. The hazardous waste incinerator of claim 8 wherein said outer combustion chamber and said inner incineration chamber are combined into an integrated component by replacing said separate annular ring of said inner incineration chamber and said annular base of said outer combustion chamber with a single common ring mounted in permanent sealing engagement with both said chambers.

14. A hazardous waste incinerator comprising:
  (i) an open-topped shell in the form of an insulated outer combustion chamber provided with fuel inlet means, combustion air inlet means, and combustion products outlet means;
  (ii) a pedestal supporting said outer combustion chamber;
  (iii) an upper support resting atop said open-topped vessel for closing-off said open-topped vessel, said support supporting a suspended inner incineration chamber which is either made from, or which is lined with, a non-porous, impervious, corrosion-resistant material, said inner incineration chamber including a floor, said floor being provided with an incineration-supporting air inlet means, products of incineration outlet means and a recirculating blower;
and
  (iv) a roof for said suspended inner incinerator chamber, said roof supporting a suspended pad support means, said roof resting atop said upper support in sealed relationship thereto;
said outer combustion chamber always being out of communication with said inner incineration chamber.

15. The hazardous waste incinerator of claim 14 wherein said seals at said upper support comprise "O"-ring seals provided with recirculation coolant means.

16. The hazardous waste incinerator of claim 14 wherein said incineration-supporting air inlet means passes through said pedestal and wherein said products of combustion outlet means passes through said base.

17. The hazardous waste incinerator of claim 14 wherein said roof of said inner incineration chamber is domed and is insulated behind a non-porous, impervious, corrosion-resistant 18. The hazardous waste incinerator of claim 14 wherein said roof of said inner incineration chamber is vertically-movable to expose said suspended pad support means.

19. A hazardous waste incinerator comprising:

(i) an insulated, rectangular parallelepiped shell having a vertically-movable front door, and providing an outer combustion chamber surrounding a rectangular parallelepiped inner incineration chamber, said outer combustion chamber being provided with fuel inlet means, combustion air inlet means and products of combustion outlet means and said inner incinerator chamber being either made from, or being lined with, a non-porous, impervious, corrosion-resistant material, said inner incinerator chamber also being provided with incineration-supporting air inlet means, products of incineration outlet means and a recirculating blower;
and
  (ii) a false wall disposed interiorly within said inner incinerator chamber and resting on a pad support means, said false wall being provided with a plurality of apertures;
said outer combustion chamber always being out of communication with said inner incineration chamber.

20. The hazardous waste incinerator of claim 19 wherein said outer combustion chamber is provided with electrical heaters behind said false wall.

21. The hazardous waste incinerator of claim 19 wherein said false wall rests on a plurality of "T"-shaped pad support means.

22. A method for incinerating hazardous waste including the provision of an outer, heat-producing zone, and an inner incineration zone, in which a charge of hazardous waste is fed only to said inner incineration zone, wherein said inner incineration zone is heated by means of heat from said outer combustion zone, said method comprising:
  providing said inner incineration zone as an impervious incineration zone having a continuous non-porous, corrosion-resistant surface; providing said inner impervious incineration zone in sealed, spaced-apart and heat-conducting relation to said outer, heat-producing zone; and withdrawing products of incineration from the inner incineration zone which are separate and distinct from, and are not mixed with, products of combustion from said outer combustion chamber.

* * * * *